(12) United States Patent
Syed et al.

(10) Patent No.: US 7,832,511 B2
(45) Date of Patent: Nov. 16, 2010

(54) HYBRID ELECTRIC VEHICLE CONTROL SYSTEM AND METHOD OF USE

(75) Inventors: Fazal Syed, Canton, MI (US); Ming Kuang, Canton, MI (US); Shunsuke Okubo, Belleville, MI (US); Matt Smith, Dearborn Heights, MI (US); John Czubay, Troy, MI (US)

(73) Assignee: Ford Global Technologies, Dearborn, MI (US)

( * ) Notice: Subject to any disclaimer, the term of this patent is extended or adjusted under 35 U.S.C. 154(b) by 661 days.

(21) Appl. No.: 11/584,921

(22) Filed: Oct. 20, 2006

(65) Prior Publication Data

US 2008/0097684 A1 Apr. 24, 2008

(51) Int. Cl.
*B60W 20/00* (2006.01)
(52) U.S. Cl. ............... 180/65.275; 180/65.1; 701/57
(58) Field of Classification Search ............ 180/65.265, 180/65.275, 65.28, 65.285; 903/930; 701/48
See application file for complete search history.

(56) References Cited

U.S. PATENT DOCUMENTS

| | | | |
|---|---|---|---|
| 5,005,133 A * | 4/1991 | Takahashi | .................. 701/98 |
| 5,345,154 A | 9/1994 | King | |
| 5,656,921 A | 8/1997 | Farrall | |
| 5,786,640 A * | 7/1998 | Sakai et al. | ................ 290/17 |
| 5,879,062 A * | 3/1999 | Koga et al. | ................ 303/152 |
| 6,242,873 B1 | 6/2001 | Drozdz et al. | |
| 6,411,944 B1 | 6/2002 | Ulyanov | |
| 6,547,697 B1 | 4/2003 | Taffin et al. | |
| 6,636,788 B2 * | 10/2003 | Tamagawa et al. | ............ 701/22 |
| 6,991,053 B2 | 1/2006 | Kuang et al. | |

FOREIGN PATENT DOCUMENTS

GB 2264369 A * 8/1993

OTHER PUBLICATIONS

"Fuzzy Control to Improve High-Voltage Battery Power and Engine Speed Control in a Hybrid Electric Vehicle", IEEE, Jun. 2005, pp. 343-348.

* cited by examiner

*Primary Examiner*—Paul N Dickson
*Assistant Examiner*—Brodie Follman
(74) *Attorney, Agent, or Firm*—Tung & Associates

(57) ABSTRACT

A rule-based fuzzy gain-scheduling proportional integral (PI) controller is provided to control desired engine power and speed behavior in a power-split HEV. The controller includes a fuzzy logic gain-scheduler and a modified PI controller that operates to improve on the control of engine power and speed in a power-split HEV versus using conventional PI control methods. The controller improves the engine power and speed behavior of a power-split HEV by eliminating overshoots, and by providing enhanced and uncompromised rise-time and settling-time.

20 Claims, 4 Drawing Sheets

FUZZY GAIN-SCHEDULING
PI CONTROLLER

FUZZY GAIN-SCHEDULING PI CONTROLLER

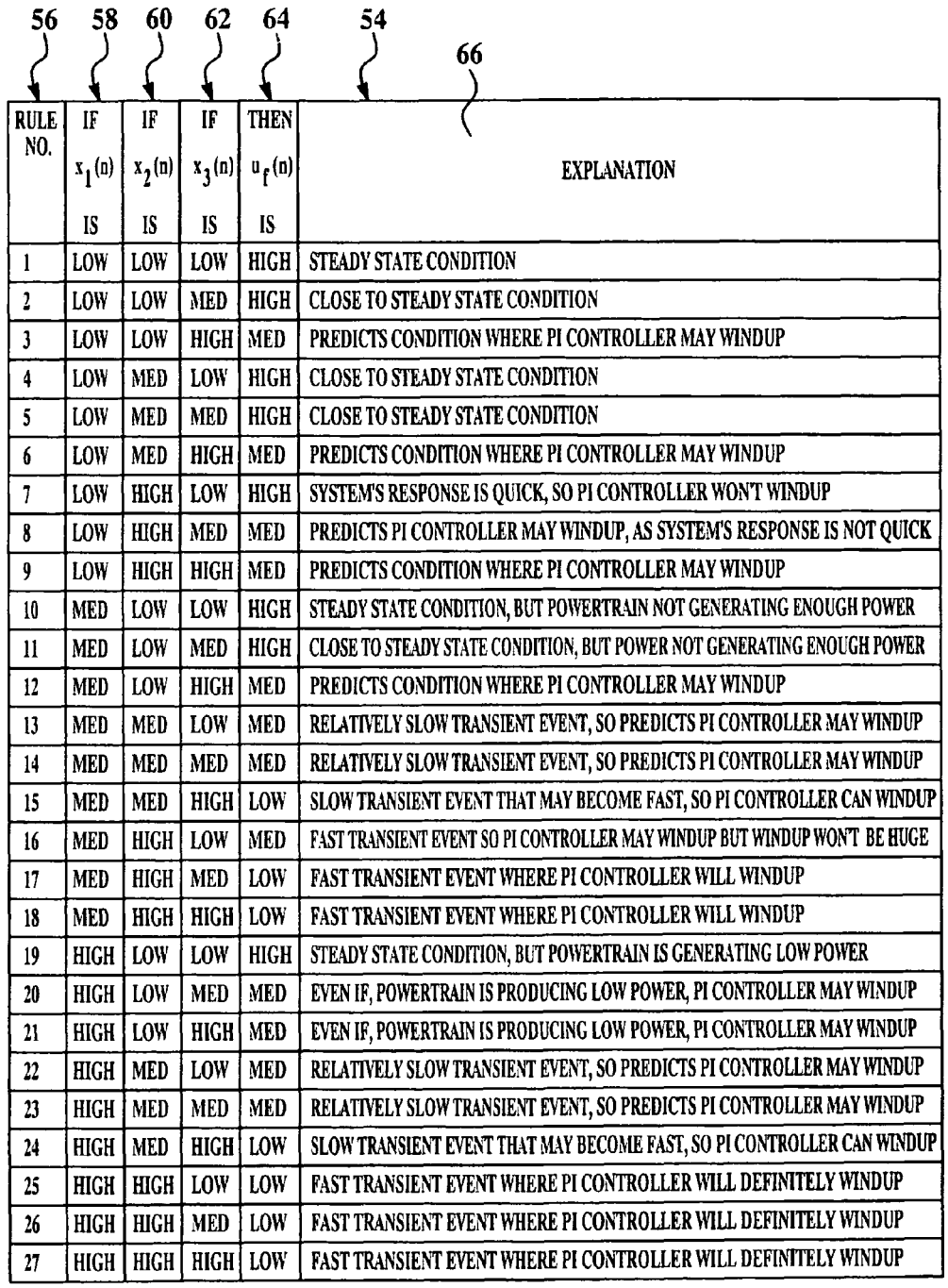

| RULE NO. | IF $x_1(n)$ IS | IF $x_2(n)$ IS | IF $x_3(n)$ IS | THEN $u_f(n)$ IS | EXPLANATION |
|---|---|---|---|---|---|
| 1 | LOW | LOW | LOW | HIGH | STEADY STATE CONDITION |
| 2 | LOW | LOW | MED | HIGH | CLOSE TO STEADY STATE CONDITION |
| 3 | LOW | LOW | HIGH | MED | PREDICTS CONDITION WHERE PI CONTROLLER MAY WINDUP |
| 4 | LOW | MED | LOW | HIGH | CLOSE TO STEADY STATE CONDITION |
| 5 | LOW | MED | MED | HIGH | CLOSE TO STEADY STATE CONDITION |
| 6 | LOW | MED | HIGH | MED | PREDICTS CONDITION WHERE PI CONTROLLER MAY WINDUP |
| 7 | LOW | HIGH | LOW | HIGH | SYSTEM'S RESPONSE IS QUICK, SO PI CONTROLLER WON'T WINDUP |
| 8 | LOW | HIGH | MED | MED | PREDICTS PI CONTROLLER MAY WINDUP, AS SYSTEM'S RESPONSE IS NOT QUICK |
| 9 | LOW | HIGH | HIGH | MED | PREDICTS CONDITION WHERE PI CONTROLLER MAY WINDUP |
| 10 | MED | LOW | LOW | HIGH | STEADY STATE CONDITION, BUT POWERTRAIN NOT GENERATING ENOUGH POWER |
| 11 | MED | LOW | MED | HIGH | CLOSE TO STEADY STATE CONDITION, BUT POWER NOT GENERATING ENOUGH POWER |
| 12 | MED | LOW | HIGH | MED | PREDICTS CONDITION WHERE PI CONTROLLER MAY WINDUP |
| 13 | MED | MED | LOW | MED | RELATIVELY SLOW TRANSIENT EVENT, SO PREDICTS PI CONTROLLER MAY WINDUP |
| 14 | MED | MED | MED | MED | RELATIVELY SLOW TRANSIENT EVENT, SO PREDICTS PI CONTROLLER MAY WINDUP |
| 15 | MED | MED | HIGH | LOW | SLOW TRANSIENT EVENT THAT MAY BECOME FAST, SO PI CONTROLLER CAN WINDUP |
| 16 | MED | HIGH | LOW | MED | FAST TRANSIENT EVENT SO PI CONTROLLER MAY WINDUP BUT WINDUP WON'T BE HUGE |
| 17 | MED | HIGH | MED | LOW | FAST TRANSIENT EVENT WHERE PI CONTROLLER WILL WINDUP |
| 18 | MED | HIGH | HIGH | LOW | FAST TRANSIENT EVENT WHERE PI CONTROLLER WILL WINDUP |
| 19 | HIGH | LOW | LOW | HIGH | STEADY STATE CONDITION, BUT POWERTRAIN IS GENERATING LOW POWER |
| 20 | HIGH | LOW | MED | MED | EVEN IF, POWERTRAIN IS PRODUCING LOW POWER, PI CONTROLLER MAY WINDUP |
| 21 | HIGH | LOW | HIGH | MED | EVEN IF, POWERTRAIN IS PRODUCING LOW POWER, PI CONTROLLER MAY WINDUP |
| 22 | HIGH | MED | LOW | MED | RELATIVELY SLOW TRANSIENT EVENT, SO PREDICTS PI CONTROLLER MAY WINDUP |
| 23 | HIGH | MED | MED | MED | RELATIVELY SLOW TRANSIENT EVENT, SO PREDICTS PI CONTROLLER MAY WINDUP |
| 24 | HIGH | MED | HIGH | LOW | SLOW TRANSIENT EVENT THAT MAY BECOME FAST, SO PI CONTROLLER CAN WINDUP |
| 25 | HIGH | HIGH | LOW | LOW | FAST TRANSIENT EVENT WHERE PI CONTROLLER WILL DEFINITELY WINDUP |
| 26 | HIGH | HIGH | MED | LOW | FAST TRANSIENT EVENT WHERE PI CONTROLLER WILL DEFINITELY WINDUP |
| 27 | HIGH | HIGH | HIGH | LOW | FAST TRANSIENT EVENT WHERE PI CONTROLLER WILL DEFINITELY WINDUP |

FIG. 9

HYBRID ELECTRIC VEHICLE CONTROL SYSTEM AND METHOD OF USE

FIELD OF THE INVENTION

The present invention generally relates to an HEV control system and more particularly, relates to use of a fuzzy logic gain scheduling based proportional integral controller to control desired engine power and speed in a HEV vehicle.

BACKGROUND

Hybrid electric vehicles (HEVs) provide for increased fuel economy and reduced emissions compared to conventional vehicles with internal combustion engines, emerged as a very strong candidate to achieve these goals. A power-split hybrid system that uses planetary gear sets to connect an engine, a generator, and a motor, exhibits great potential to improve fuel economy by enabling the engine to operate at its most efficient operating region is shown in Prior Art FIG. 1.

Prior Art FIG. 1 illustrates a block diagram of a power-split hybrid electric vehicle (HEV) 20 and the power-split HEV's associated control system. The power-split hybrid system combines the benefits of both the parallel and series types of hybrid systems without sacrificing the cost effectiveness of the hybrid system. The power-split hybrid system has an internal combustion engine 22 connected to a planetary gear-set 24 having a carrier, a sun, and a ring gear, which can transmit torque to the wheels 26, 28 with the proper reaction torque of a generator 30 together with a traction motor 32. The traction motor 32 is used to supplement the wheel torque, similar to a parallel hybrid system. Since the generator 30 provides reaction torque to the engine 22, it can generate electricity for the traction motor 32, similar to a series hybrid system. A high voltage (HV) battery 34 acts as energy storage or additional power source device for the system 20. The power-split hybrid system also has the capability of driving the vehicle on electric power as well (a full hybrid electric vehicle). The two electric machines 30, 32 along with the engine 22 in this power-split hybrid architecture require a highly coordinated vehicle control system.

The power-split hybrid electric vehicle powertrain consists of two power sources: a combination of the engine 22, the generator 30 and the planetary gear set 24, and a combination of the motor 32 and the battery 34.

The planetary gear set 24 provides interconnection between the engine 22, the generator 30, and the motor 32, wherein the carrier gear is connected to the engine 22, sun gear is connected to the generator 30, and the ring gear is connected to the motor 32. The motor 32 is also connected to the wheels 26, 28 through gear reductions. This planetary gear configuration provides decoupling of the engine speed from the vehicle speed, which provides a great potential to achieve better engine efficiency.

The powertrain system consists of four subsystems/components including an engine subsystem, a transaxle subsystem, brake subsystem, and a battery subsystem. Each subsystem requires an associated controller to perform a respective specific function.

A transaxle subsystem controller module (TCM) 36 is integrated with the transaxle subsystem. The transaxle subsystem contains the planetary gear set 24 and the two electric machines, the motor 32 and the generator 30. The electric machines allow for both electrical and hybrid functionality and are used for different purposes depending on the driving conditions.

The brake subsystem 38 is an electro-hydraulic brake system, which provides the seamless integration of the friction brakes and regenerative braking functionality. To ensure that all these controllers work together to meet the driver's demand and provide desired energy management and functionality, a supervisory vehicle system controller is used.

The vehicle system controller (VSC) 40 communicates with each subsystem controller, and both manages and coordinates the drivetrain functions to satisfy a driver's request and to balance the energy flow to and from the multiple power units (engine, transaxle, and HV battery). The VSC 40 must balance the energy flow through the planetary gear-set 24 to provide various vehicle attributes. This is achieved by VSC 40 through various unique hybrid functionalities such as electric drive, regenerative braking, engine start-stop, hybrid drive, and HV battery power maintenance. For a given driver demand (through accelerator and brake pedal requests) and vehicle operation conditions, the VSC 40 maintains the vehicle at its most efficient operating point by managing the power among the various components of the vehicle 20 and coordinating the operating state of the engine 22, the generator 30, the motor 32, and the HV battery 34. In addition, the VSC 40 ensures the required vehicle's performance and drivability.

A sophisticated VSC 40 is required to achieve better fuel economy, emissions, and energy management without compromising vehicle's performance.

It is the responsibility of the VSC 40 to maintain the HV battery 34 at an optimum state of charge (SOC) by controlling the actual HV battery power. The actual HV battery power in this system is the result of the engine power, wheel power (or torque) and system losses. The optimum HV battery maintenance is achieved by constantly monitoring the HV battery SOC and calculating a desired HV battery power to achieve a target SOC. Once the VSC 40 has determined a desired HV battery power, it uses the desired HV battery power along with the driver power request (based on the driver inputs such as, accelerator and brake pedal) to calculate a feed-forward engine power. Feedback on the instantaneous HV battery power, using a conventional PI controller, controls the desired engine power such that the desired HV battery power is achieved. The desired engine power is finally split into desired engine torque and desired engine speed, which are then sent to the respective subsystem controllers.

FIG. 2 shows a power flow diagram of the power-split hybrid electric vehicle system 20. The vehicle 20 is capable of being driven in either an electric vehicle like drive mode (EV mode), or hybrid electric modes (HEV mode) such as, positive split, negative split, or parallel mode.

The power-split powertrain system provides a continuous variable transmission (CVT)-like functionality through the planetary gear set 24 and generator control to decouple the engine speed from the vehicle speed, and through the motor 32 that transmits part of the engine power from the engine electrical path (generator) to the wheels 26, 28. The CVT functionality achieves better engine efficiency and lower emissions by controlling the engine speed independent of the vehicle speed.

Use of nonlinear approaches have been used to control engine idle speed of non-hybrid vehicles. In a power-split hybrid vehicle, the engine speed is controlled independent of the vehicle speed to provide desired driver and HV battery power, which requires a sophisticated nonlinear vehicle system control algorithm. Due to the nonlinear behavior of the engine along with the engine response delay (which is a function of various environmental conditions) and engine inertial terms, the desired engine power is achieved differently under different driving conditions.

To control actual high-voltage (HV) battery power, a sophisticated controls system that controls engine power and thereby engine speed to achieve the desired HV battery maintenance power is provided. Conventional approaches use proportional-integral (PI) control systems to control the actual HV battery power in power-split HEV, which can sometimes result in either overshoots of engine speed and power or degraded response and settling times due to the nonlinearity of the power-split hybrid system.

Use of a conventional proportional integral (PI) controller, such as the PI-controller 44 shown in FIG. 3, for determining desired engine power may result in undesired engine speed response behavior under certain driving conditions. Such an undesired engine speed response is perceived by the driver as unintuitive response as it is caused by the conventional PI controller, and not by the driver's request.

Conventional control methods use linear control algorithms to control engine power, which can result in undesired engine speed behavior. The undesired behavior arises from the fact that a complete high fidelity mathematical model for the power-split HEV system along with the environmental effects cannot be accurately modeled inside a conventional controller.

Therefore, a modified controller adaptable to control nonlinear behaviors that does not require detailed knowledge of mathematical models of the engine power plant is needed to compensate for nonlinear behaviors associated with an engine power plant in a HEV.

SUMMARY

A rule-based fuzzy gain-scheduling proportional integral (PI) controller is provided to control desired engine power and speed behavior in a HEV. The controller includes a fuzzy logic gain-scheduler and a modified PI controller that operates to compensate for nonlinearities in engine power and vehicle speed in a HEV. The controller improves the engine power and speed behavior of a HEV by eliminating overshoots, and by providing enhanced and uncompromised rise-time and settling-time.

A method of using the controller to compensate for nonlinearities and control engine behavior is also provided.

BRIEF DESCRIPTION OF THE DRAWINGS

These and other objects, features and advantages of the present invention will become apparent from the following detailed description and the appended drawings in which:

Input membership functions associated with the input variables $x_1(n)$, $x_2(n)$, and $x_3(n)$ are shown in FIGS. 6-8, respectively.

FIG. 9 is a table representing a plurality of associated fuzzy rules associated with the fuzzy gain-scheduling controller in accordance with one embodiment of the invention.

DETAILED DESCRIPTION

Figure 1:
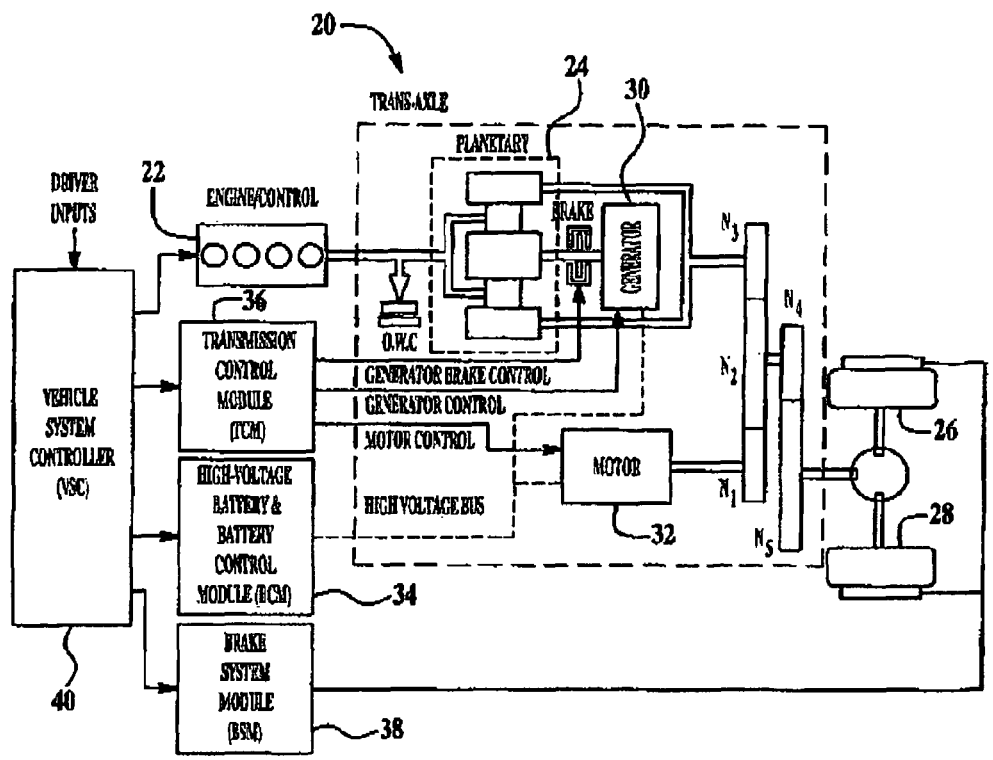
FIG. 1 illustrates a block diagram of a conventional power-split hybrid electric vehicle (HEV).
Figure 2:
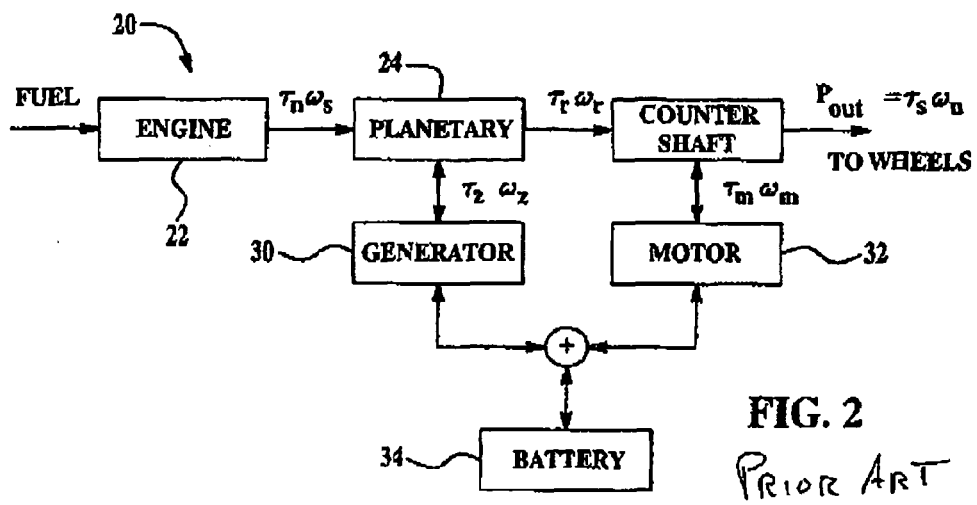
FIG. 2 illustrates a power flow diagram of the HEV shown in FIG. 1.

Generally provided is a system and method to improve vehicle performance by controlling engine power and speed behavior in a power-split HEV through use of a fuzzy controller. In one embodiment of the invention, fuzzy gain-scheduling is used to schedule an appropriate gain for a proportional-integral (PI) controller based on the system's operating conditions. The system and method of the present invention eliminates the overshoots as well as faster response and settling times in comparison with a conventional linear PI control approach. The fuzzy controller is operated in accordance with fuzzy rules designed by utilizing human control knowledge and experience for intuitively constructing the fuzzy controller to achieve desired control behavior for engine power and speed.

Fuzzy control provides a way to cope with the limitations of conventional controllers. The fuzzy gain-scheduling control system and method operates to control desired engine power and speed in a power-split hybrid electric vehicle, thereby resulting in an improved engine speed behavior. Fuzzy gain-scheduling is used to determine an appropriate gain for an associated PI controller based on the system's operating conditions.

A conventional PI based control system may prove effective for linear or nearly linear control issues, however, nonlinear PI controllers such as the fuzzy gain-scheduling controller of the present invention are needed to satisfactorily control nonlinear plants, time-varying plants, or plants with significantly large time delays.

The nonlinear PI controller of the present invention provides an anti-windup scheme that may resolve integrator windup problems typically associated with conventional PI controllers. The fuzzy logic control system of the present invention does not require a mathematical model of the system to be controlled, and allows for the development of a knowledge-based nonlinear controller. Thus, fuzzy logic based PI controllers may be used for nonlinear control of such plants.

The fuzzy logic system control of the present invention provides a power-split HEV closed-loop system with enhanced response and controllability. Without compromising the stability of the system, the control system provides significant reduction in anti-windup to help reduce engine speed and power overshoots. The fuzzy gain-scheduling based engine power control system provides a smoother desired engine speed output, thereby providing for an improvement in customer satisfaction.

Fuzzy Controller Design

The engine power control system is responsible for determining a desired engine speed ($\omega_{eng\_des}$) and a desired engine torque ($T_{eng\_des}$) for engine operation under all conditions for achieving total vehicle efficiency. This is achieved by evaluating a driver power request ($P_{drv\_req}$) and a desired HV battery power ($P_{batt\_des}$) required for HV battery maintenance. The driver power request ($P_{drv\_req}$) is calculated based on an accelerator pedal input, a brake pedal input, and a vehicle speed. The desired HV battery power ($P_{batt\_des}$) for HV battery maintenance is calculated based on a state of charge of the HV battery and various other environmental conditions.

During the hybrid mode of operation of the vehicle, when the engine is running, a desired engine power ($P_{eng\_des}$) is calculated based on a desired feed-forward engine power ($P_{eng\_ff}$) and HV battery feedback power ($P_{batt\_f\_b}$). The desired feed-forward engine power ($P_{eng\_ff}$) is calculated primarily based on the driver power request ($P_{drv\_req}$) and the desired HV battery power ($P_{batt\_des}$). The HV battery feedback power ($P_{batt\_fb}$) is calculated using a PI controller based on the actual HV battery power ($P_{bat\_act}$).

Figure 3:
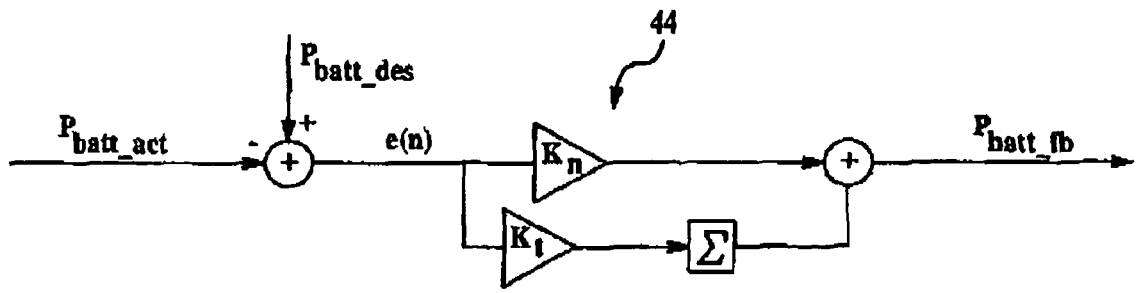
FIG. 3 illustrates a schematic of a conventional proportional integral (PI) controller.

Conventional techniques use conventional PI controllers 44 to calculate the HV battery feedback power as shown in FIG. 3. The present invention replaces the conventional PI controller 44 with a fuzzy gain-scheduling PI controller 46. Hence, the HV battery feedback power is calculated using a fuzzy gain-scheduling PI controller of the present invention.

The desired engine power is then calculated as the sum of a desired feed-forward engine power and the HV battery feedback power ($P_{batt\_fb}$). A desired engine speed is calculated based on the desired engine power and on overall vehicle system optimum criteria. An engine torque is calculated from the desired engine power divided by the desired engine speed. Since vehicle system optimum criteria typically requires engine to be operated close to the maximum engine torque, the changes in desired engine torque are minimal and may be treated as constant.

Figure 4:
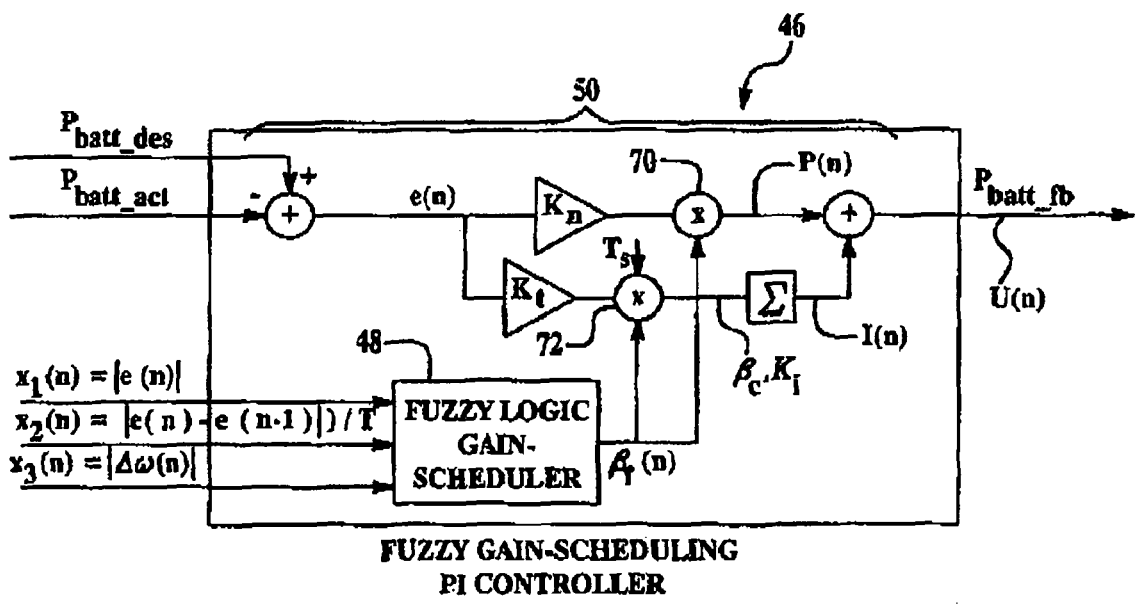
FIG. 4 illustrates a schematic of a fuzzy gain-scheduling PI controller in accordance with one embodiment of the invention.

A schematic of the fuzzy gain-scheduling PI controller 46 is shown in FIG. 4. The fuzzy gain-scheduling PI controller 46 shown in FIG. 4 operates to control the engine and power train to achieve improved engine behavior. The fuzzy gain-scheduling PI controller 46 improves engine behavior in a power-split HEV by utilizing the human control knowledge and experience to intuitively construct an intelligent controller so that the resulting controller will emulate a desired control behavior to a certain extent.

In one embodiment of the invention, the fuzzy controller is defined by a multiple-input single-output (MISO) Mamdani fuzzy gain-scheduling PI controller 46. The fuzzy gain-scheduling PI controller 46 includes a MISO fuzzy logic gain-scheduler 48 and a PI controller 50. The terms and output of the fuzzy gain-scheduling PI controller 46 as shown in FIG. 4 are determined by Equations (1)-(3):

$$P(n) = \beta_f(n) K_p e(n) \quad (1)$$

$$I(n) = \sum_{i=1}^{n} \beta_f(n) K_i e(i) T_s = K_i \sum_{i=1}^{n} \beta_f(n) e(i) T_s \quad (2)$$

$$u(n) = P(n) + I(n) \quad (3)$$

wherein $\beta_f$ defines a fuzzy logic gain-scheduler output, $\beta_f K_p$ defines a proportional gain, $\beta_f K_i$ defines an integral gain, e(n) defines an error between a desired HV battery power and an actual HV battery power and $T_s$ defines the sampling time. Both the proportional gain and the integral gain are dynamically modified by the fuzzy gain-scheduler output $\beta_f$, and the final output u(n) is the sum of the proportional term, P(n), and the integral term, I(n).

The fuzzy gain-scheduling PI controller 46 controls the fuzzy logic gain-scheduler output $\beta_f$ to a first multiplier 70 associated with a proportional portion of the controller 46 and also to a second multiplier 72 associated with an integral portion of the controller 46.

If a conventional PI controller was only used instead of the MISO fuzzy logic gain-scheduler, then the fuzzy gain-scheduling PI controller shown in FIG. 4 would be replaced by the conventional PI controller block from FIG. 3, and the equations governing the behavior of the conventional PI controller would be as shown:

$$P(n) = K_p e(n) \quad (4)$$

$$I(n) = K_i \sum_{i=1}^{n} e(i) T_s \quad (5)$$

$$u(n) = P(n) + I(n) \quad (6)$$

To design the fuzzy logic gain-scheduler 46, input variables, output variables, and input and output fuzzy sets need to be defined. It is important to correctly select the desired input variables for the fuzzy logic gain-scheduler so that improved engine behavior can be achieved.

Since the conventional PI controller used the error e(n) between the desired HV battery power and the actual HV battery power as an input, shown in FIG. 3 and equations (4)-(6), and used the error e(n) to control the engine behavior during steady state events, the magnitude of the error term in equations (4)-(6) is selected as a first input variable $X_1(n)$, shown in FIG. 4, to the fuzzy logic gain-scheduler 48.

Similarly, to control engine behavior during transient events, the magnitude of the rate of change of the error r(n) is used as a second input variable $X_2(n)$, shown in FIG. 4, into the control system of the present invention.

Finally, an absolute difference between commanded engine speed (actual engine speed) and the target engine speed is used as a third input variable $X_3(n)$, because it can be used as a predictor of undesired behavior and hence, can improve and control engine behavior.

The input variables $X_1(n)$, $X_2(n)$, and $X_3(n)$ for the controller are determined in accordance's with Equations (7)-(9):

$$x_1(n) = |e(n)| = |P_{\text{batt\_des}}(n) - P_{\text{batt\_act}}(n)| \quad (7)$$

$$x_2(n) = |r(n)| = \left|\frac{d}{dt}e(n)\right| \approx \frac{|e(n) - e(n-1)|}{T_s} \quad (8)$$

$$x_3(n) = |\Delta\omega(n)| = |\omega_{\text{eng\_targ}}(n) - \omega_{\text{eng\_act}}(n)| \quad (9)$$

wherein $P_{batt\_des}$ is a desired HV battery power, $P_{batt\_act}$ is an actual HV battery power, $T_s$ is a sampling time, $\omega_{eng\_targ}$ is a target engine speed, and $\omega_{eng\_act}$ is a commanded or actual engine speed.

Figure 5:
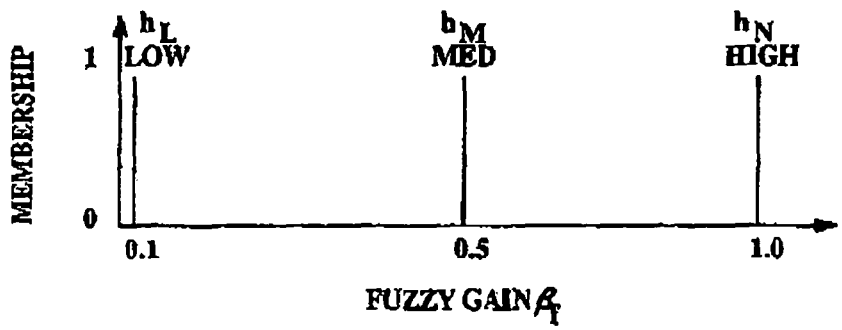
FIG. 5 is a graphical illustration of output fuzzy sets associated with a fuzzy gain $\beta_f$ in accordance with one embodiment of the invention.
Figure 6:
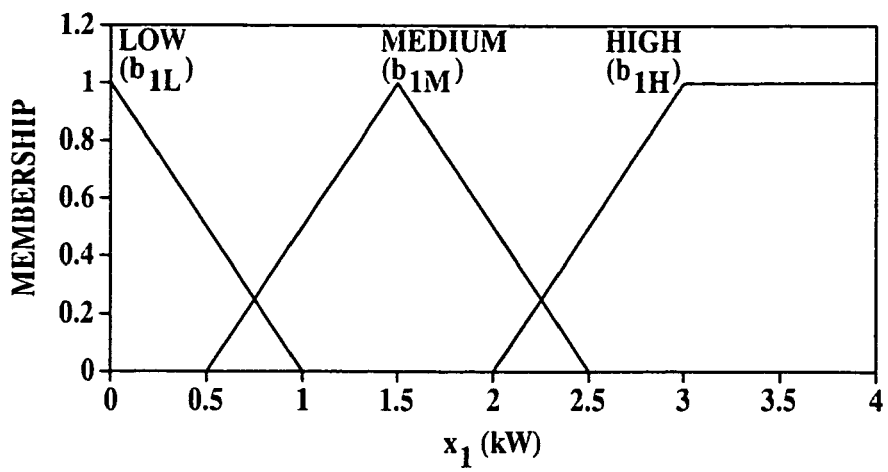
FIG. 6 is a graphical illustration mapping input membership functions with associated first input variables $x_1(n)$ in accordance with one embodiment of the invention.
Figure 7:
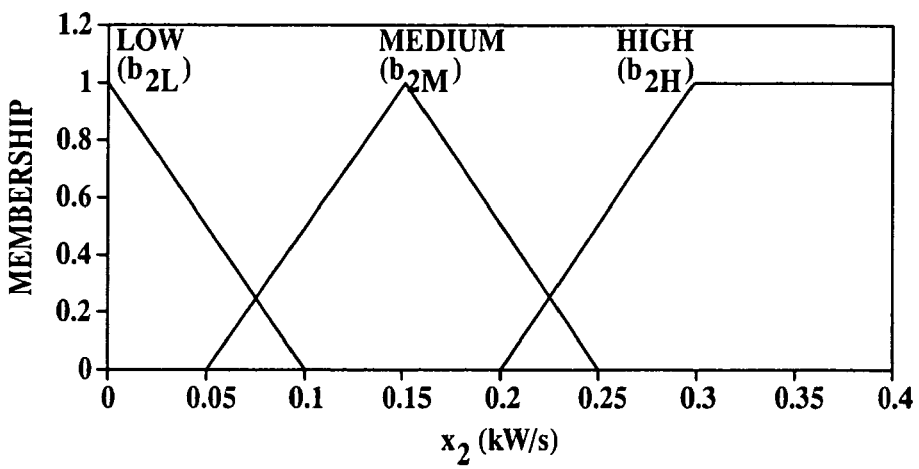
FIG. 7 is a graphical illustration mapping input membership functions with associated second input variables $x_2(n)$ in accordance with one embodiment of the invention.
Figure 8:
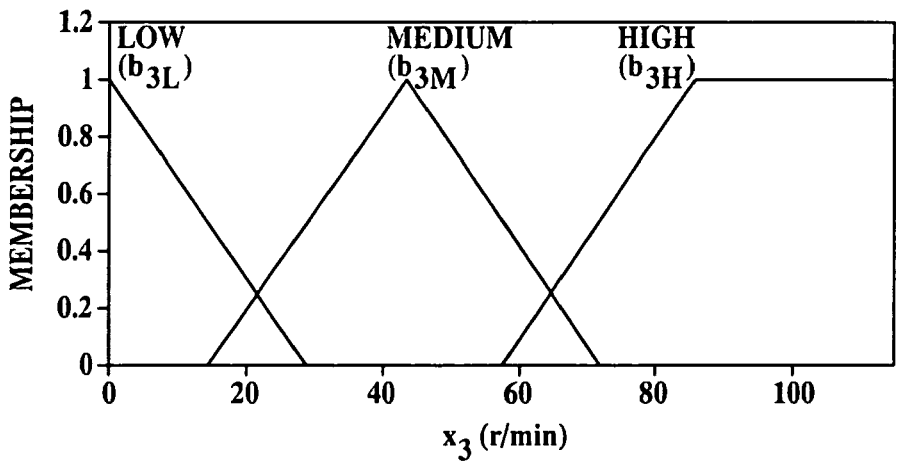
FIG. 8 is a graphical illustration mapping input membership functions with associated third input variables $x_3(n)$ in accordance with one embodiment of the invention.

Input membership functions associated with the input variables $x_1(n)$, $x_2(n)$, and $x_3(n)$ are shown in FIGS. 6-8, respectively. Associated output fuzzy sets are singleton types associated with fuzzy gain $\beta_f$ are shown in FIG. 5.

FIG. 9 is a table 54 representing a plurality of associated fuzzy rules associated with the fuzzy gain-scheduling controller 46 in accordance with one embodiment of the invention. As shown in FIG. 9, table 54 has a column 56 defining an associated fuzzy rule number, a column 58 defining antecedent conditions associated with the first input variable $X_1(n)$, a column 60 defining antecedent conditions associated with the second input variable $X_2(n)$, a column 62 defining antecedent conditions associated with the third input variable $X_3(n)$, a column 64 defining a consequent or resulting output $U_f(n)$ of the fuzzy gain-scheduling PI controller based on the logical ANDing of the input variables, and a column 66 defining an explanation of each of the rules.

The fuzzy rules are laid out in a manner such that they may distinguish between various HEV powertrain behaviors and make decisions based on current and future states of the powertrain. The fuzzy rules operate to define conditions where PI controller will not windup, and conditions where the PI controller will windup. In addition, the fuzzy rules provide the ability for the controller to anticipate conditions where PI controller may windup, thereby providing a mechanism to avoid possible undesirable behaviors.

The description of the fuzzy rules is also shown in Table 54. Among the fuzzy rules, some of the rules are intended to cover steady state and transient conditions, and the other fuzzy rules are used for special conditions, such as conditions where the PI controller may possibly windup.

The first part of the rules, which are called antecedents, specifies the condition for the specific rule. The antecedents contain linguistic terms, such as low, medium and high, which reflect human knowledge of the system behavior. The antecedents shown in columns 58, 60, and 62 are defined as a combination of logical and operators. The language following the antecedent is the consequent, the output $U_f(n)$ or the action of the controller.

The rule 1, where $x_1(n)$, $x_2(n)$, $x_3(n)$ are all low, depicts a steady state condition and hence allows for scheduling of a high value ($h_H$) for the multiplier, $\beta_f(n)$.

In rule 2, even though $x_3(n)$ is medium, the other inputs, $x_1(n)$ and $x_2(n)$, that are low imply that the system is in a condition close to steady state and hence allows for scheduling of a high value ($h_3$) for $\beta_f(n)$.

The rule 3, where $x_1(n)$ and $x_2(n)$, are low, but, $x_3(n)$ is high, predicts that a condition exist, due to the huge difference of desired and actual engine speed, where the PI controller may windup, and hence corrects for this issue by lowering the value of $\beta_f(n)$ to medium ($h_M$).

The rule 4, where $x_2(n)$ is medium, meaning that the magnitude of the rate of change of error between the desired and actual HV battery power is relatively larger than an ideal small value, but since the other inputs, $x_1(n)$ and $x_3(n)$, are low indicates that the system is in a condition that more closely resembles a steady state condition and hence allows for scheduling of a high value ($h_H$) for $\beta_f(n)$.

The rule 5, where $x_1(n)$ is low, and the other inputs, $x_2(n)$ and $x_3(n)$, are medium indicates that the system is in a condition that somewhat resembles a steady state condition and hence allows for scheduling of a high value ($h_H$) for $\beta_f(n)$.

The rule 6, where $x_1(n)$ is low, and $x_2(n)$ is medium, but, $x_3(n)$ is high, predicts that conditions exist, due to the huge difference of desired and actual engine speed, and a medium rate of change of error magnitude, that the PI controller may windup, and hence corrects for this issue by lowering the value of $\beta_f(n)$ to medium ($h_M$).

The rule 7, where $x_1(n)$ and $x_3(n)$ is low, and $x_2(n)$ is high, indicates that the system's response is quick, as the magnitude of rate of change of error between desired and actual HV battery power is large but the magnitude of this error is still small, and therefore the PI controller will not windup. Under this condition, a high value ($h_H$) of $\beta_f(n)$ is scheduled.

The rule 8, where $x_1(n)$ is low, and $x_2(n)$ is high, and $x_3(n)$ is medium indicates that the system's response may not be as quick as than in rule 7 because $x_3(n)$ is relatively greater, and therefore predicts that conditions exist where the PI controller may windup. Under this condition, a medium value ($h_M$) of $\beta_f(n)$ is scheduled. The rule 9, where $x_1(n)$ is low, and $x_2(n)$ is high, and $x_3(n)$ is high clearly predicts that conditions exist where the PI controller may windup, and hence corrects for this issue by scheduling the value of $\beta_f(n)$ to medium ($h_M$).

The rule 10, where $x_1(n)$ is medium, but $x_2(n)$, and $x_3(n)$ are both low, clearly indicates a steady state condition where for some reason the powertrain is not generating enough power and hence resulting is a relatively larger error between the desired and the actual HV battery power. Therefore a high value ($h_H$) of $\beta_f(n)$ is scheduled under this condition to increase the desired power from the powertrain to minimize this error as quickly as possible.

Similarly, in rule 11, even though $x_2(n)$ is low, the other inputs, $x_1(n)$ and $x_3(n)$, that are medium imply that the system is in a condition close to steady state and the powertrain may not be producing enough power hence allows for scheduling of a high value ($h_H$) for $\beta_f(n)$.

The rule 12, where $x_1(n)$ is medium, $x_2(n)$ is low, but $x_3(n)$ is high, predicts that conditions exist, due to the huge difference of desired and actual engine speed, where the PI controller may windup, and hence corrects for this issue by lowering the value of $\beta_f(n)$ to medium ($h_M$).

The rules 13 and 14, where $x_1(n)$ and $x_2(n)$ are both medium, meaning that the magnitude of the error and rate of change of error between the desired and actual HV battery power is relatively larger than an ideal small value, and $x_3(n)$ is either low or medium, indicates that system is in a relatively slow transient event and predicts that conditions exist where the PI controller may windup and hence schedules of a medium value ($h_M$) for $\beta_f(n)$.

The rule 15, where $x_1(n)$ and $x_2(n)$ are both medium, and $x_3(n)$ is high indicates that system is currently in a relatively slower transient event which may become a fast transient event due to the fact that $x_3(n)$ is high. Hence the PI controller may windup, and therefore a low value ($h_L$) of $\beta_f(n)$ is scheduled.

The rule 16, where $x_1(n)$ is medium, $x_2(n)$ is high, and $x_3(n)$ is low, indicates that the system is in a fast transient event, and therefore the PI controller may windup. But since $x_3(n)$ is low, the amount of windup may not be large, hence under this condition, a medium value ($h_M$) of $\beta_f(n)$ is scheduled.

The rules 17 and 18, where $x_1(n)$ is medium, and $x_2(n)$ is high, and $x_3(n)$ is either medium or low indicates that the system is in a fast transient event, and the PI controller may windup. Hence a low value ($h_L$) of $\beta_f(n)$ is scheduled.

The rule 19, where $x_1(n)$ is high, but $x_2(n)$, and $x_3(n)$ are both low, clearly indicates a steady state condition where for some reason the powertrain is producing low power resulting in a large error between the desired and the actual HV battery power. Therefore a high value ($h_H$) of $\beta_f(n)$ is scheduled under this condition to increase the desired powertrain (engine) power to reduce this error as quickly as possible.

Similarly, in rule 20, where $x_1(n)$ is high, $x_2(n)$ is low, and $x_3(n)$ is medium, indicates that even though the powertrain may not be producing enough power, but at the same time there exist a condition that the PI controller may windup due to relatively larger $x_3(n)$. Hence, a medium value ($h_M$) for $\beta_f(n)$ is scheduled for this condition.

The rule 21, where $x_1(n)$ is high, $x_2(n)$ is low, but $x_3(n)$ is high, predicts that conditions exist, due to the huge difference of desired and actual engine speed, where the PI controller may windup, and hence corrects for this issue by lowering the value of $\beta_f(n)$ to medium ($h_M$).

The rules 22 and 23, where $x_1(n)$ is high, $x_2(n)$ is medium, meaning that the magnitude of the error and rate of change of error between the desired and actual HV battery power is relatively larger than an ideal small value, and $x_3(n)$ is either low or medium, indicates that system is in a relatively slow transient event and predicts that conditions exist where the PI controller may windup and hence schedules of a medium value ($h_M$) for $\beta_f(n)$.

The rule 24, where $x_1(n)$ is high, $x_2(n)$ is medium, and $x_3(n)$ is high indicates that system is currently in a relatively slower transient event which may become a fast transient event due to the fact that $x_3(n)$ is high. Hence the PI controller may windup, and therefore schedules a low value ($h_L$) of $\beta_f(n)$.

The rules 25, 26 and 27, where $x_1(n)$ is high, $x_2(n)$ is high, and $x_3(n)$ is either low, medium or high indicates that the system is in a fast transient event, and therefore the PI controller will windup. Hence under this condition, a low value ($h_L$) of $\beta_f(n)$ is scheduled.

If $\Omega$ represents the total number of fuzzy rules ($\Omega=27$ in our case) and $\mu_j(x_i,\tilde{A}_{i,j})$ represents the combined membership value from the antecedent of the jth rule, the output, $u_f(n)$, of the fuzzy scheduler can be written as follows when the centroid defuzzifier is employed, $$\beta_f(n) = \frac{\sum_{j=1}^{\Omega} \mu_j(x_1, \tilde{A}_{1,j})\mu_j(x_2, \tilde{A}_{2,j})\mu_j(x_3, \tilde{A}_{3,j})\tilde{h}_j}{\sum_{j=1}^{\Omega} \mu_j(x_1, \tilde{A}_{1,j})\mu_j(x_2, \tilde{A}_{2,j})\mu_j(x_3, \tilde{A}_{3,j})} \quad (10)$$

where $x_i$ represents all the inputs (i=1 . . . 3) and $\tilde{A}_{i,j}$ is a vector involving all the input fuzzy sets and $\tilde{h}_j$ represents the output fuzzy set for the j-th rule.

Using (1) to (3), the complete fuzzy controller system for engine power control can be described by the following equation:

$$u(n) = K_p \frac{\sum_{j=1}^{\Omega} \mu_j(x_1, \tilde{A}_{1,j})\mu_j(x_2, \tilde{A}_{2,j})\mu_j(x_3, \tilde{A}_{3,j})\tilde{h}_j}{\sum_{j=1}^{\Omega} \mu_j(x_1, \tilde{A}_{1,j})\mu_j(x_2, \tilde{A}_{2,j})\mu_j(x_3, \tilde{A}_{3,j})} e(n) + K_i T_s \sum_{i=1}^{n} \frac{\sum_{j=1}^{\Omega} \mu_j(x_1, \tilde{A}_{1,j})\mu_j(x_2, \tilde{A}_{2,j})\mu_j(x_3, \tilde{A}_{3,j})\tilde{h}_j}{\sum_{j=1}^{\Omega} \mu_j(x_1, \tilde{A}_{1,j})\mu_j(x_2, \tilde{A}_{2,j})\mu_j(x_3, \tilde{A}_{3,j})} e(i) \quad (11)$$

Controlling engine power in a power-split hybrid electric vehicle requires development of sophisticated control systems and algorithms. The present invention provides an approach that uses the rule-based fuzzy gain-scheduling PI controller to control desired engine power and speed behavior in a power-split HEV. Traditionally, a conventional controller with a fast rise-time and settling-time can result in engine speed and power overshoots in a power-split HEV, as the conventional approaches use linear control methods. However the developed fuzzy gain-scheduling PI controller may improve on the control of engine power and speed in a power-split HEV versus using the conventional PI control methods. The use of fuzzy gain-scheduling controller of the present invention is effective in significantly improving the engine power and speed behavior of a power-split HEV by eliminating overshoots, and by providing enhanced and uncompromised rise-time and settling-time.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A control system for a hybrid electric vehicle (HEV) comprising:
 a fuzzy gain-scheduling proportional integral (PI) controller that operates to control an engine power, engine speed, and vehicle powertrain in response to predefined operating conditions, said fuzzy gain-scheduling proportional integral (PI) controller comprising a fuzzy logic gain-scheduler having an associated output in communication with a PI controller, said output comprising an input to said PI controller, said input modified within said PI controller to produce a gain output from said (PI) controller, said gain output comprising an output of said fuzzy gain-scheduling proportional integral (PI) controller.

2. The control system of claim 1, wherein the fuzzy gain-scheduling PI controller controls the associated fuzzy logic gain-scheduler output, $\beta_f$, to a first multiplier associated with a proportional portion of the PI controller and to a second multiplier associated with an integral portion of the PI controller.

3. The control system of claim 1, wherein the fuzzy gain-scheduling PI controller comprises:
 said fuzzy logic gain-scheduler comprising a multiple-input single output (MISO) fuzzy logic gain-scheduler; and
 said PI controller having a proportional gain of $\beta_f K_p$ and an integral gain of $\beta_f K_i$ that are each dynamically modified by said fuzzy gain-scheduler output $\beta_f$ from the MISO fuzzy logic gain-scheduler.

4. The control system of claim 1, further comprising:
 an associated first input variable $X_1$ defined as a magnitude of an error e(n) between a desired hybrid vehicle battery power ($P_{batt\_des}(n)$) and an actual hybrid vehicle battery power ($P_{bat\_act}(n)$), said actual battery power dependent on engine power, torque, and power losses attributable to said HEV system;
 an associated second input variable $X_2$ defined as a magnitude of a rate of change of the error e(n); and
 an associated third input variable $X_3(n)$ defined as an absolute difference between a commanded engine speed and a target engine speed.

5. The control system of claim 4, further comprises:
 a final output u(n) of the fuzzy gain-scheduling PI controller, the output having a sum of a proportional term P(n) defined by the proportional gain multiplied by the error e(n) and an integral term I(n) defined by a sum of the integral gain multiplied by an error e(i) and a sampling time $T_s$, wherein i is calculated over the sampling time $T_s$ from i equals 1 to n.

6. The control system of claim 1, wherein a plurality of fuzzy rules associated with the fuzzy gain-scheduling PI controller are provided to distinguish between various HEV powertrain conditions and to make decisions regarding current and future states of said powertrain associated with the HEV.

7. The control system of claim 6, wherein at least one of the plurality of associated fuzzy logic rules comprises:
   a rule to detect a steady state condition.

8. The control system of claim 6, wherein at least one of the plurality of associated fuzzy logic rules comprises:
   a rule to determine that the powertrain is not generating enough power.

9. The control system of claim 6, wherein at least one of the plurality of associated fuzzy logic rules comprises:
   a rule to detect a close to steady state condition.

10. The control system of claim 6, wherein at least one of the plurality of associated fuzzy logic rules comprises:
    a rule to predict a condition resulting in a possible PI controller windup.

11. The control system of claim 6, wherein at least one of the plurality of associated fuzzy logic rules comprises:
    a rule to detect a quick system response resulting in no PI controller windup.

12. The control system of claim 6, wherein at least one of the plurality of associated fuzzy logic rules comprises:
    a rule to detect a slower system response resulting in a possible PI controller windup.

13. The control system of claim 6, wherein at least one of the plurality of associated fuzzy logic rules comprises:
    a rule to detect a relatively slow transient event, wherein the relatively slow transient event predicts when a PI controller may windup.

14. The control system of claim 6, wherein at least one of the plurality of associated fuzzy logic rules comprises:
    a rule to detect a slower transient event that may transition to a fast event, thus resulting in a PI controller possible windup.

15. The control system of claim 6, wherein at least one of the plurality of associated fuzzy logic rules comprises:
    a rule to detect a fast transient event, wherein a PI controller may windup but will not have a large windup associated therewith.

16. The control system of claim 6, wherein at least one of the plurality of associated fuzzy logic rules comprises:
    a rule to detect a fast transient event resulting in a PI controller windup.

17. The control system of claim 6, wherein at least one of the plurality of associated fuzzy logic rules comprises:
    a rule to detect that the powertrain is producing power resulting in a possible PI controller windup.

18. The control system of claim 6, wherein at least one of the plurality of associated fuzzy logic rules comprises:
    a rule to detect a fast transient event resulting in a PI controller windup.

19. A control method for controlling a hybrid electric vehicle comprising:
    providing a fuzzy gain-scheduling proportional integral (PI) controller that operates to control an engine power, engine speed, and vehicle powertrain in response to predefined operating conditions, said fuzzy gain-scheduling proportional integral (PI) controller comprising a fuzzy logic gain-scheduler having an associated output in communication with a PI controller, said output comprising an input to said PI controller, said input modified within said PI controller to produce a gain output from said (PI) controller, said gain output comprising an output of said fuzzy gain-scheduling proportional integral (PI) controller;
    using said fuzzy gain-scheduling proportional integral controller to control said engine power, engine speed, and vehicle powertrain.

20. The method for controlling a hybrid electric vehicle of claim 19, further comprises:
    inputting a first variable into the controller to control engine behavior during steady-state events, said first variable defining a magnitude of an error e(n) between a desired hybrid vehicle battery power ($P_{batt\_des}(n)$) and an actual hybrid vehicle battery power ($P_{bat\_act}(n)$), said actual battery power dependent on engine power, torque, and power losses attributable to said HEV system;
    inputting a second input variable into the controller to control engine behavior during transient events, said second input variable defining a magnitude of a rate of change of the error e(n); and
    inputting a third variable into the controller to predict and control undesired engine behavior, said third variable defining an absolute difference between a commanded engine speed and a target engine speed.

* * * * *